(12) United States Patent
Ackerman

(10) Patent No.: US 12,010,133 B2
(45) Date of Patent: Jun. 11, 2024

(54) SECURITY THREAT MONITORING FOR NETWORK-ACCESSIBLE DEVICES

(71) Applicant: SOPHOS LIMITED, Abingdon (GB)

(72) Inventor: Karl Ackerman, Burlington, MA (US)

(73) Assignee: Sophos Limited, Abingdon (GB)

( * ) Notice: Subject to any disclaimer, the term of this patent is extended or adjusted under 35 U.S.C. 154(b) by 127 days.

(21) Appl. No.: 17/724,213

(22) Filed: Apr. 19, 2022

(65) Prior Publication Data
US 2023/0336575 A1  Oct. 19, 2023

(51) Int. Cl.
*H04L 9/40* (2022.01)
*H04L 41/149* (2022.01)
*H04L 43/028* (2022.01)
*H04L 61/2514* (2022.01)

(52) U.S. Cl.
CPC ........ *H04L 63/1425* (2013.01); *H04L 41/149* (2022.05); *H04L 43/028* (2013.01); *H04L 61/2514* (2013.01); *H04L 63/1433* (2013.01)

(58) Field of Classification Search
CPC . H04L 41/149; H04L 43/028; H04L 61/2514; H04L 63/1425; H04L 63/1433
See application file for complete search history.

(56) References Cited

U.S. PATENT DOCUMENTS

| | | | |
|---|---|---|---|
| 7,624,447 B1* | 11/2009 | Horowitz | H04L 63/0263 726/23 |
| 10,754,958 B1* | 8/2020 | Sidagni | G06F 21/552 |
| 2017/0235622 A1* | 8/2017 | Boyapalle | G06F 11/3065 714/47.2 |
| 2018/0324219 A1* | 11/2018 | Xie | H04L 63/0209 |
| 2019/0319987 A1* | 10/2019 | Levy | H04L 9/50 |
| 2020/0329068 A1* | 10/2020 | Findlay | H04L 63/1433 |
| 2021/0392171 A1* | 12/2021 | Srinivas | G06N 5/047 |
| 2023/0113375 A1* | 4/2023 | Thomas | H04L 63/1408 726/23 |
| 2023/0135186 A1* | 5/2023 | Hen | G06F 21/552 726/23 |

* cited by examiner

*Primary Examiner* — Thomas J Dailey
(74) *Attorney, Agent, or Firm* — IP Spring

(57) ABSTRACT

Various aspects related to threat management are disclosed. An example method includes monitoring network traffic on a computer network that includes a plurality of endpoints, identifying a software application executing on at least one endpoint from one or more of the sent data or the received data, where execution of the software application is associated with a startup time window and a post-startup time window, determining a security status score for the at least one endpoint based on a comparison of the sent data and the received data with a known pattern of network activity associated with the software application, wherein the known pattern of network activity is based upon the startup time window of the software application, determining a threat status for the at least one endpoint based on the security status score, and, generating an indication of the threat status for the at least one endpoint.

18 Claims, 8 Drawing Sheets

SECURITY THREAT MONITORING FOR NETWORK-ACCESSIBLE DEVICES

TECHNICAL FIELD

Embodiments relate generally to threat management in a computer network, and more particularly, to methods, systems, and computer readable media for security threat monitoring for network-accessible devices.

BACKGROUND

With continually evolving computer security threats, there remains a need for automated, semi-automated, and manual techniques to quickly mitigate security threats.

SUMMARY

Implementations of this application relate to methods, systems, and computer readable media for security threat monitoring for network-accessible devices.

According to one aspect, a computer-implemented method is provided. The computer-implemented method may include monitoring network traffic on a computer network that includes a plurality of endpoints, wherein the network traffic for each endpoint includes sent data that is transmitted from the endpoint and received data that is received by the endpoint over the computer network; identifying a software application executing on at least one endpoint from one or more of the sent data or the received data, wherein: the execution of the software application is associated with at least two time windows, and the at least two time windows comprise a startup time window and a post-startup time window; determining a security status score for the at least one endpoint based on a comparison of the sent data and the received data with a known pattern of network activity associated with the software application, wherein the known pattern of network activity is based upon the startup time window of the software application; determining a threat status for the at least one endpoint based on the security status score; and generating an indication of the threat status for the at least one endpoint.

In some implementations, the network traffic is encrypted, and monitoring the network traffic comprises: identifying a plurality of destination addresses from the sent data, wherein the destination addresses are Internet Protocol (IP) addresses; and analyzing the network traffic to determine destination IP addresses that are associated with the endpoints without decrypting the network traffic.

In some implementations, determining the security status score comprises: determining a level of match between network traffic features associated with the destination IP addresses for the at least one endpoint with the known pattern of network activity; and adjusting the security status score based on the level of match such that endpoints with destination IP addresses that have a first level of match to the known pattern of network activity are assigned higher security status scores than endpoints that have a second level of match, wherein the first level of match is greater than the second level of match.

In some implementations, the received data includes a plurality of data items received from a first group of endpoints and a second group of endpoints, and the computer-implement method further comprises: determining a size of each of the plurality of data items, wherein received data items that have a size different than a known size of software application patches are determined to be associated with the first group of endpoints, and wherein received data items that have a size similar to the known size of software application patches are determined to be associated with the second group of endpoints; and wherein determining the security status score comprises assigning to each endpoint in the first group of endpoints a score lower than any endpoint in the second group of endpoints.

In some implementations, the computer-implemented method further comprises: directing one or more endpoints of the plurality of endpoints to install a current version of the software application from a trusted product vendor; and building the known pattern of network activity based on the network traffic of the one or more endpoints with the current version of the software application.

In some implementations, the computer-implemented method further comprises: directing one or more endpoints of the plurality of endpoints to update a prior version of the software application to a current version of the software application from a trusted product vendor; and building the known pattern of network activity based on network traffic of the one or more endpoints during updating of the software application.

In some implementations, the computer-implemented method further comprises: characterizing network traffic of one or more trusted endpoints of the plurality of endpoints to create a baseline pattern of network activity as the known pattern of network activity.

In some implementations, the determining the security status score comprises determining that the endpoint has a startup time window that deviates from an established startup time window.

In some implementations, the known pattern of network activity comprises: network activity associated with one or more trusted endpoints of the plurality of endpoints.

In some implementations, determining the threat status comprises: comparing the security status score to a variable security status threshold, wherein the variable security status threshold is varied from a base threshold based upon a threat detection model deployed at the at least one endpoint, wherein the threat detection model is configured to monitor kernel-level activity at the at least one endpoint.

In some implementations, the computer-implemented further comprises updating the known pattern of network activity based upon observation of threat statuses for one or more trusted endpoints of the plurality of endpoints.

In some implementations, the computer-implemented further comprises: based on the threat status, initiating a security action on the endpoint, wherein the security action includes one or more of: running an anti-malware scan; terminating the software application; restarting the software application; or verifying a digital signature of the software application.

In some implementations, the computer-implemented method further comprises: activating an endpoint agent at the at least one endpoint, wherein the endpoint agent is configured to monitor the network traffic, identify the software application, and determine the security status score.

In some implementations, the endpoint agent is further configured to perform one or more of: identifying when a process associated with the software application is initiated and associate a network activity pattern with process launch; determining when the software application has been changed or updated; or determining that the software application has been recently updated.

According to another aspect, a computer-implemented method is provided. The computer-implemented method may comprise: monitoring network traffic on a computer network that includes a plurality of endpoints; associating a software application executing on at least one endpoint with the monitored network traffic, wherein the execution of software application is associated with at least two time windows, and wherein the at least two time windows comprise a startup time window and a post-startup time window; determining if previous patterns of network activity are known for the startup time window of the software application; if the previous patterns are known, determining a security status score for the at least one endpoint based on a comparison of the monitored network traffic and the previous patterns of network activity; determining a threat status for the at least one endpoint based on the security status score; and generating an indication of the threat status for the at least one endpoint.

In some implementations, the computer-implemented method further comprises: if previous patterns are known, determining if the monitored network traffic is correlated with the previous patterns of network activity; and if the monitored network traffic is correlated with the previous patterns, updating the previous patterns of network activity to include at least a portion of the monitored network traffic.

In some implementations, the computer-implemented method further comprises: determining if the software application is a new process or new application; if the software application is a new process or new application, determining if the software application is an expected software application for the at least one endpoint; if the software application is an expected software application, determining if the monitored network traffic contains a pattern of network activity similar to malware; if the pattern of network activity similar to malware is determined, adjusting the security status score; and if the pattern of network activity is dissimilar to malware, creating or updating a previous pattern of network activity for the software application.

In some implementations, the computer-implemented method further comprises: determining if the software application received an expected software update; if the software application received the expected update, determining if the monitored network traffic contains a pattern of network activity similar to malware; and if the pattern of network activity similar to malware is determined, adjusting the security status score; and if the pattern of network activity is dissimilar to malware, creating or updating a previous pattern of network activity for the software application.

According to another aspect, a threat management computer system for managing security threats on an enterprise network is provided. The threat management computer system may comprise: a memory with instructions stored thereon; one or more processing devices, coupled to the memory, the one or more processing devices configured to access the memory and execute the instructions; and one or more network devices coupled to the one or more processing devices and configured to receive requests issued by a plurality of client devices. The instructions cause the one or more processing devices to perform operations including: monitoring network traffic on a computer network that includes a plurality of endpoints, wherein the network traffic for each endpoint includes sent data that is transmitted from the endpoint and received data that is received by the endpoint over the computer network; identifying a software application executing on at least one endpoint from one or more of the sent data or the received data, wherein the execution of software application is associated with at least two time windows, and wherein the at least two time windows comprise a startup time window and a post-startup time window; determining a security status score for the at least one endpoint based on a comparison of the sent data and the received data with a known pattern of network activity associated with the software application, wherein the known pattern of network activity is based upon the startup time window of the software application; determining a threat status for the at least one endpoint based on the security status score; and generating an indication of the threat status for the at least one endpoint.

In some implementations, determining the security status score comprises: determining a level of match between network traffic features associated with destination IP addresses for the at least one endpoint with the known pattern of network activity; and adjusting the security status score based on the level of match such that endpoints with destination IP addresses that have a first level of match to the known pattern of network activity are assigned higher security status scores than endpoints that have a second level of match, wherein the first level of match is greater than the second level of match.

According to yet another aspect, portions, features, and implementation details of the systems, methods, non-transitory computer-readable media, and computer program products may be combined to form additional aspects, including some aspects which omit and/or modify some or portions of individual components or features, include additional components or features, and/or other modifications; and all such modifications are within the scope of this disclosure.

DETAILED DESCRIPTION

One or more implementations described herein relate to security threat monitoring for network-accessible devices. Generally, security products (e.g., security software suites, security consoles, etc.) provide different protections, and can be managed at a central threat management facility. The security products may scan memory, disks, and other components of a device to determine a security status. For example, applications installed on the device may be associated with various processes executing and identifiable in memory and/or through kernel access into processing threads. A process that is trusted (e.g., based on digital signatures, reputations, scans, etc.) can also become compromised. The compromise may be caused by a variety of factors.

Compromise can occur, for example, by a compromised update (e.g., by poisoning the supply chain, such as the Solar Winds incident), poisoning the communication of updates (e.g., by compromising a DNS server and redirecting a process to another location/server), and/or by modifying the application or a library used by an application. A trusted process also might be modified in memory to change the behavior of the trusted process (e.g., by directly injecting into the process). When trusted processes become compromised, it may be difficult for existing and conventional security products to accurately determine security status.

The below detailed description is presented in reference to these and other scenarios where network administrators and others can benefit from security threat monitoring for network-accessible devices capable of discerning if trusted processes are compromised, and automated tools to remediate security threats based on suspicious content, malicious content, and/or security threats for the network-accessible devices.

Figure 1:
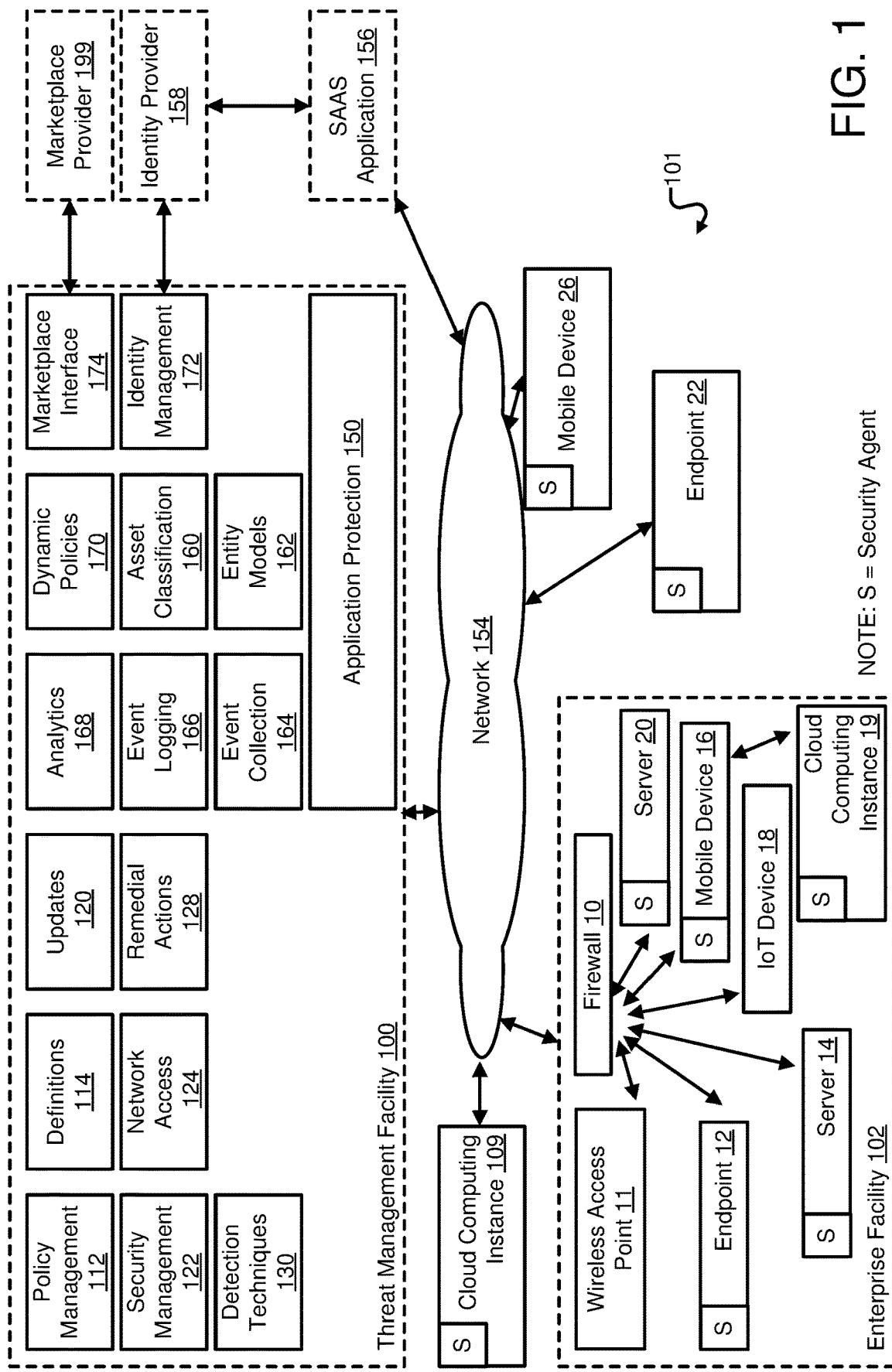
FIG. 1 is a diagram of an example enterprise network threat management system, in accordance with some implementations.

FIG. 1 depicts a block diagram of a threat management system 101 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 101. A number of capabilities may be provided by the threat management facility 100, with an overall goal to monitor security threats, network activity, and indicators of compromise, and to remediate threats on endpoints/hosts and/or services, based upon the security threats and indicators of compromise. The threat management facility 100 can also monitor network traffic to identify potential threats and/or deploy policies based on the monitoring. The threat management facility 100 may be or may include a gateway such as a web security appliance that is actively routing and/or assessing the network requests for security purposes. Another overall goal is to provide protection needed by an organization that is dynamic and able to adapt to evolving threats to devices using the enterprise network. According to various aspects, the threat management facility 100 may provide protection from a variety of threats to a variety of compute instances in a variety of locations and network configurations.

As one example, users of the threat management facility 100 may define and enforce policies that control access to and use of compute instances, networks, and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 100 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 100 may be provided as a stand-alone solution. In other implementations, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

According to some implementations, network traffic associated with the update facility functions may be monitored to determine that network-accessible devices are appropriately applying security updates. In this manner, network-accessible devices may be monitored to determine that trusted security software receives security patches, software patches, virus definitions, and other similar code portions, and do not become compromised.

The threat management facility 100 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources.

Example policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 100 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 100, or, for example, by a hosted system. In some implementations, the threat management facility 100 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of web sites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
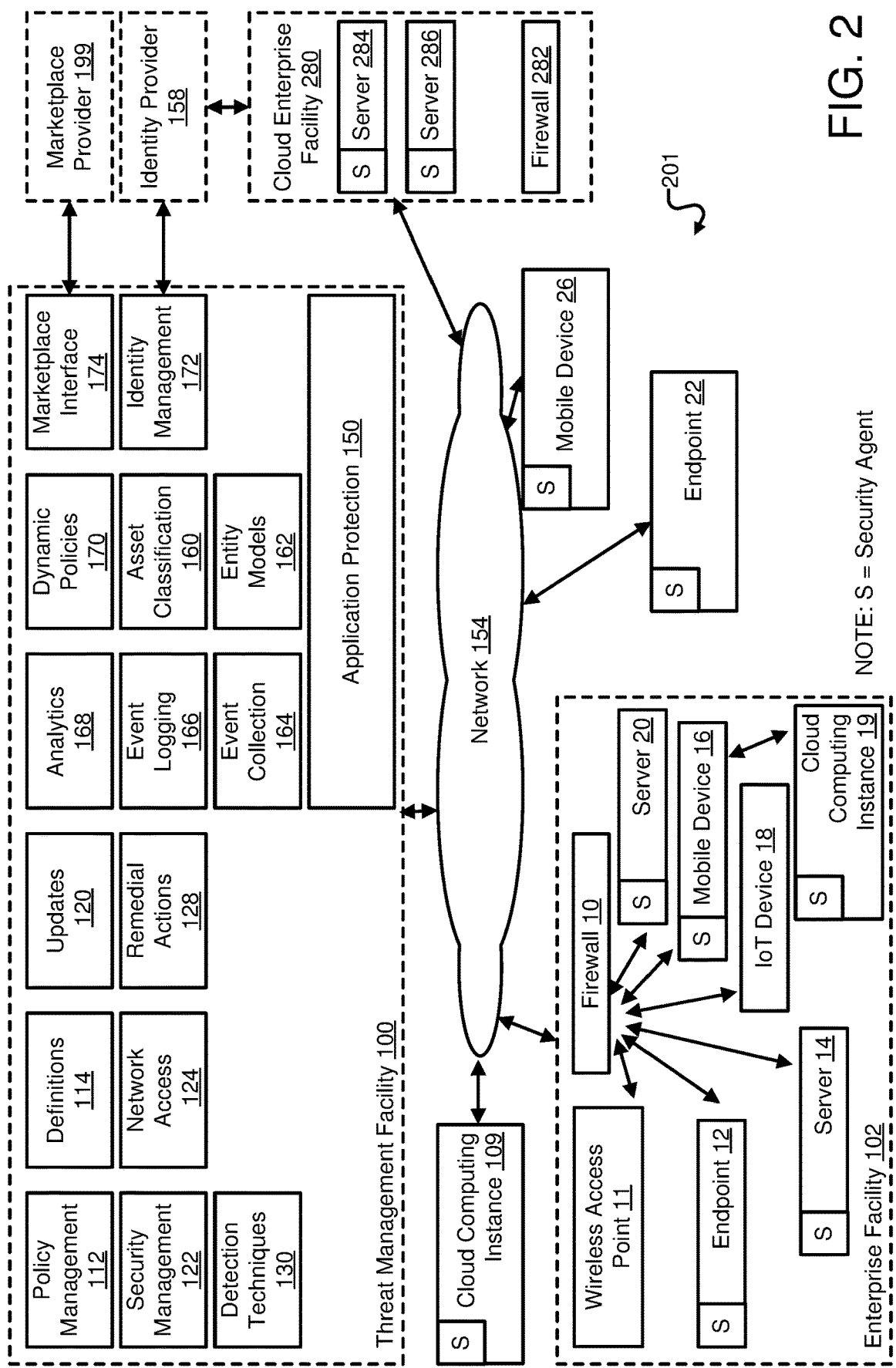
FIG. 2 is a diagram of an example enterprise network threat management system, in accordance with some implementations.

FIG. 2 depicts a diagram of a threat management system 201 such as any of the threat management systems described herein, and additionally including a cloud enterprise facility 280. Generally, systems 101 and 201 are similar; therefore, superfluous description of like elements is omitted herein for the sake of brevity and clarity of disclosure.

The cloud enterprise facility 280 of system 201 may include servers 284, 286, and a firewall 282. The servers 284, 286 on the cloud enterprise facility 280 may run one or more enterprise applications and make them available to the compute instances 10-26 of enterprise facility 102. It should be understood that there may be any number of servers 284, 286 and firewalls 282, as well as other compute instances in a given cloud enterprise facility 280. It also should be understood that a given enterprise facility may use either or both of SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
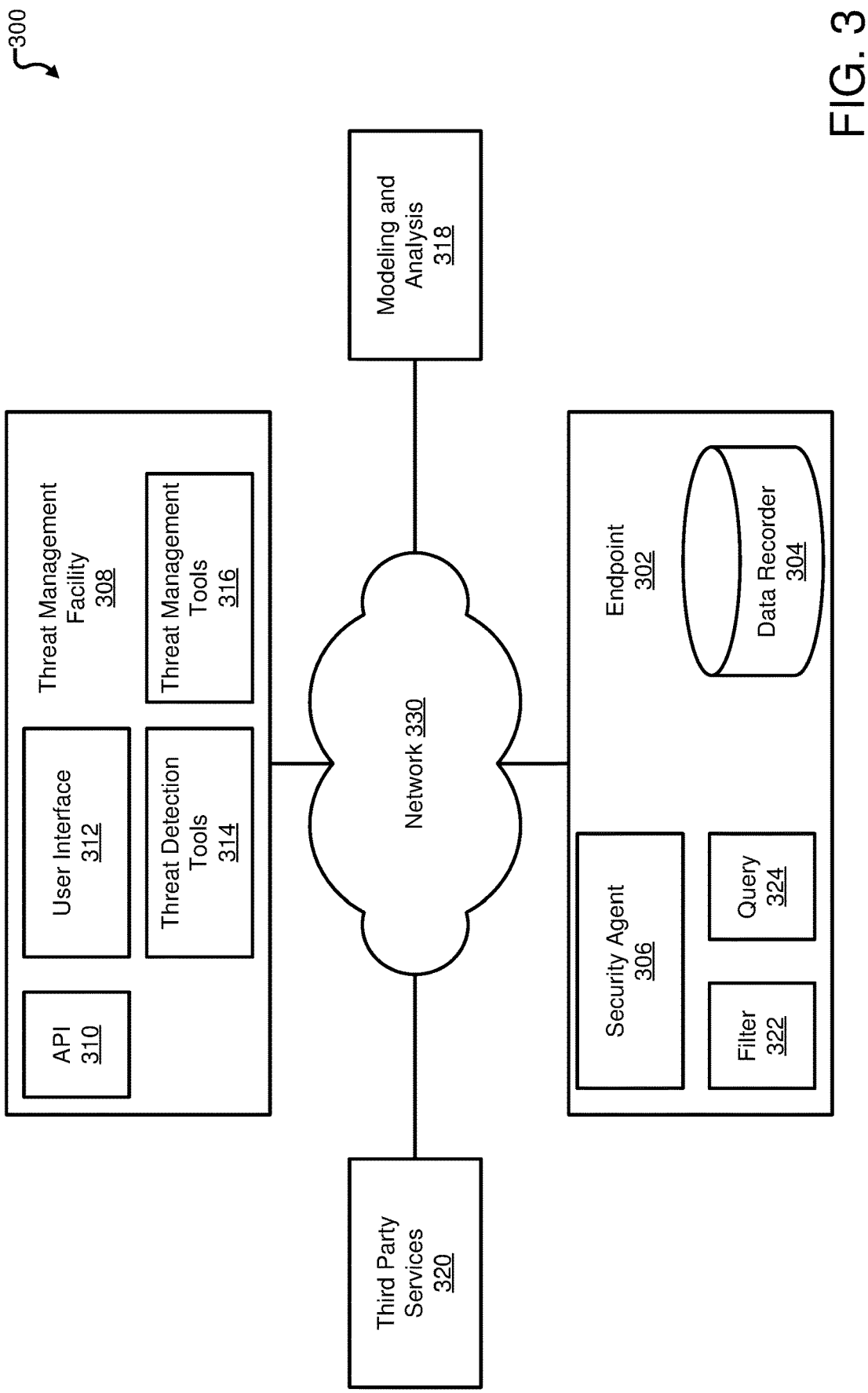
FIG. 3 is a schematic of an example enterprise network threat management system, in accordance with some implementations.

FIG. 3 shows a system 300 for enterprise network threat detection. System 300 may include one or more endpoints, e.g., endpoint 302; a threat management facility 308 (e.g., similar to facility 100 of FIGS. 1 and 2); a modeling and analysis platform 318; and one or more third party services 320 (hosted on third party computing devices, all coupled via network 330. It is noted that each of the threat management facilities 100 (e.g., of FIGS. 1 and 2) and 308 may be the same threat management facility or different threat management facilities. Furthermore, each component of FIG. 3 may be used in combination with any of the components of FIG. 1 and FIG. 2. The system 300 may also use any of the various tools and techniques for threat management described herein.

Endpoints such as the endpoint 302 may log events in a data recorder 304, e.g., a database or other storage. A local agent on the endpoint 302 such as the security agent 306 may filter this data and feed a filtered data stream to a threat management facility 308 such as a central threat management facility or any of the other threat management facilities described herein. As discussed below, filtering the data stream ensures that data is prepared for threat detection, forensic analysis, and/or other security threat mitigation activity.

The threat management facility 308 can locally or globally tune filtering by local agents based on the filtered data stream, and can query local event data recorders for additional information where necessary or helpful in threat detection or forensic analysis. The threat management facility 308 may also (or alternatively) store and deploy a number of security tools such as a web-based user interface that is supported by machine learning models to aid in the identification and assessment of potential threats by a human user. This may, for example, include machine learning analysis of new network traffic, models to provide human-readable context for evaluating potential threats, and any of the other tools or techniques described herein. More generally, the threat management facility 308 may include one or more of a variety of threat management tools 316 to aid in the detection, evaluation, and remediation of threats or potential threats.

The threat management facility 308 may perform a range of threat management functions such as any of those described herein. In some implementations, the threat management facility 308 may provide an application programming interface 310 for third party services 320 from trusted security vendors, a user interface 312 for access to threat management and network administration functions, and one or more threat detection tools 314.

In general, the application programming interface 310 may support programmatic connections with third party services 320 that facilitate exchange of data between threat management facility 308 and third party services 320. The application programming interface 310 may, for example, connect to a directory service (e.g., such as Active Directory™), or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The third party services 320 may include any suitable services, including, for example, emerging threat identifier services. The emerging threat identifying services may provide data and/or information related to emerging security threats for use in determinations as described herein.

The user interface 312 may include a web site or other graphical interface or the like, and may generally provide an interface for user interaction with the threat management facility 308, e.g., for threat detection, policy administration, network administration, audit, configuration and so forth. This user interface 312 may generally facilitate curation of potential threats, e.g., by presenting threats along with other supplemental information, and providing controls for a user to dispose of such threats as desired, e.g., by permitting execution or access, by denying execution or access, or by engaging in remedial measures such as sandboxing, quarantining, vaccinating, and so forth. The user interface 312 may also facilitate updating network traffic patterns for expected software updates, for expected software application activity, and for other types of software network traffic, through a centralized interface.

The threat detection tools 314 may include any of the threat detection tools, algorithms, or techniques described herein, or any other tools for detecting threats or potential threats within an enterprise network. This may, for example, include network behavioral tools, machine learning models, and so forth. In general, the threat detection tools 314 may use network traffic data caused by endpoints within the enterprise network, as well as any other available context such as heartbeats, to detect malicious software or potentially unsafe conditions for a network or endpoints connected to the network. In one aspect, the threat detection tools 314 may ingest network activity data from one or more endpoints (including, e.g., network components such as gateways, routers and firewalls) for improved threat detection in the context of complex or distributed threats. The threat detection tools 314 may also, or instead, include tools for reporting to a separate modeling and analysis platform 318, e.g., to support further investigation of security issues, creation or refinement of security status detection models or algorithms, review, and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances described herein. This may, for example, include end-user computing devices, mobile devices, firewalls, gateways, servers, routers, and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, updating policies, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint 302. This may, for example, include events associated with computing objects on the endpoint 302 such as file manipulations, software installations, and so forth. This may also or instead include activities directed from the endpoint 302, such as requests for content from Uniform Resource Locators (URLs) or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parameterized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, network traffic, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. Furthermore, endpoints and network-accessible devices may be monitored (e.g., associated network traffic may be monitored) and compared to activity associated with the endpoint 302 such that inferences as to the security status of the endpoints (e.g., based upon expected update activity in a startup time window) can be made. Additionally, the threat management facility can effectuate remediation of endpoints when suspicious activity is detected.

Figure 4:
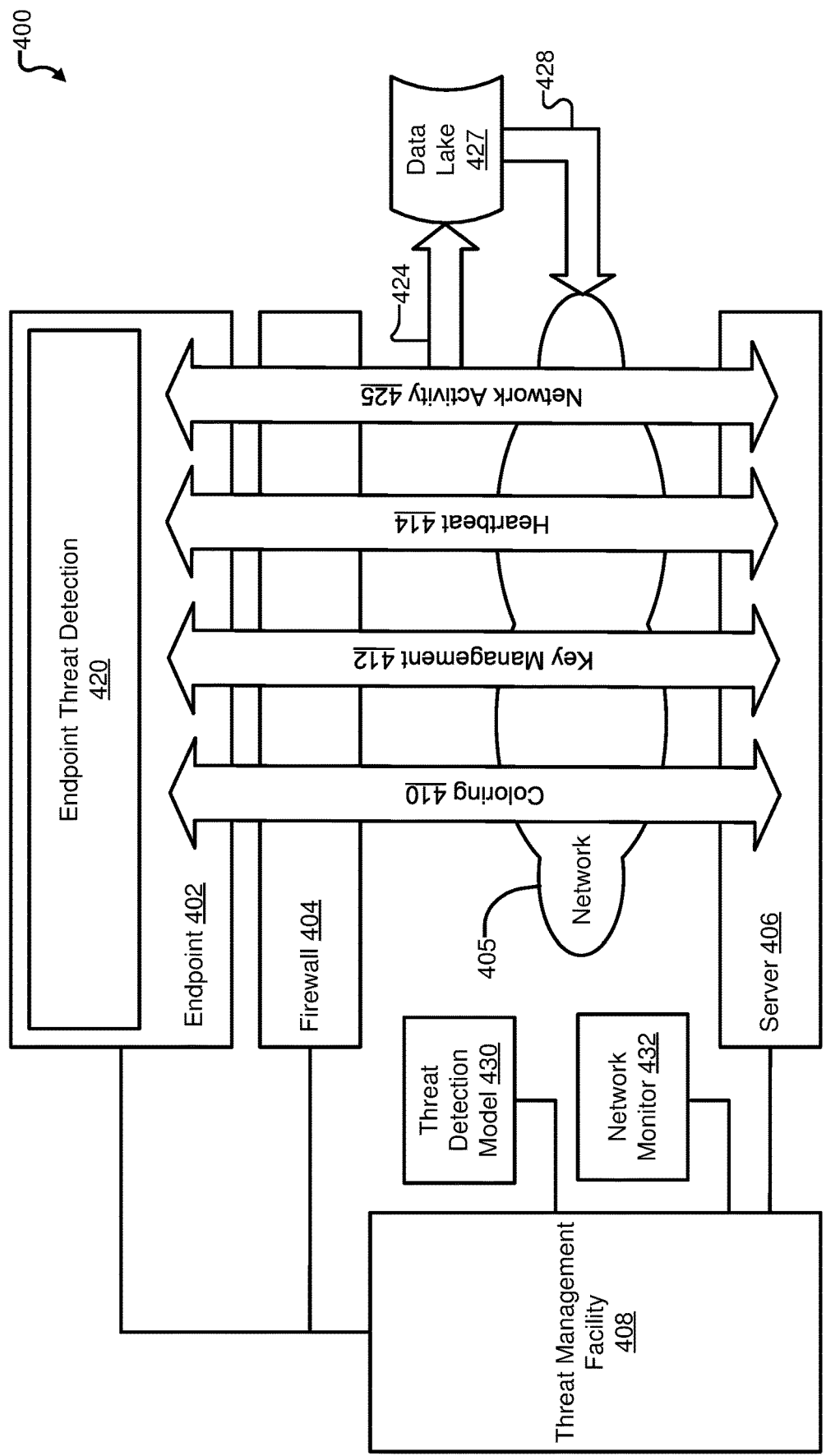
FIG. 4 is a block diagram of an example enterprise network threat management system, in accordance with some implementations.

FIG. 4 is a block diagram of an enterprise network threat management system 400. In general, the system 400 may include an endpoint 402, a firewall 404, a server 406, and a threat management facility 408 (e.g., similar to facility 100 of FIGS. 1 and 2, and facility 308 of FIG. 3) coupled to one another directly or indirectly through a data network 405, as described above. It is noted that each of the threat management facilities 100, 308, and 408 may be the same threat management facility or different threat management facilities. Furthermore, each component of FIG. 4 may be used in combination with any of the components of FIG. 1, FIG. 2, and FIG. 3. The system 400 may also use any of the various tools and techniques for threat management described herein.

Each of the entities depicted in FIG. 4 may, for example, be implemented on one or more computing devices such as the computing device described herein. A number of systems may be distributed across these various components to support threat detection, such as a coloring system 410, a key management system 412, a heartbeat system 414, and a network activity system 425, each of which may include software components executing on any of the foregoing system components, and each of which may communicate with the threat management facility 408 and an endpoint threat detection agent 420 executing on the endpoint 402 to support improved threat detection and remediation.

The system 400 may employ a threat detection model 430, such as a machine learning model, to assist in analyzing network traffic to make determinations as described herein. The threat detection model 430 may also include machine learning models trained on known malicious software to aid in identifying, isolating, and mitigating threats from malicious software.

In one implementation, the threat detection model 430 includes a machine learning model configured to determine a security status score for an endpoint, such as a networked computer system associated with an enterprise network.

According to one implementation, the machine learning model is configured to classify a type of software threat and/or vulnerability. According to one implementation, the machine learning model is configured to classify an executable program, executing or stored on a computer system, as one or more of trojan, virus, worm, backdoor, or adware. The machine learning model may also be configured in other manners associated with detecting, categorizing, classifying, and other suitable manners. Other machine learning models that are not associated with security threats may also be applicable.

The system 400 may also include a network monitor 432, such as a micro-service or other software component, configured to analyze network activity and provide network activity patterns as inputs to the threat detection model 430. The network monitor 432, although illustrated as a separate and singular component, may include additional software components executing on any of the foregoing system components, and each of which may communicate with the threat management facility 408 and an endpoint threat detection agent 420 executing on the endpoint 402 to support improved threat detection and remediation. Additionally, the network monitor 432 may be instead or alternatively included as computer-executable code portions directing another component to perform network activity analysis and other functions as described herein.

The coloring system 410 may be used to label or color software objects for improved tracking and detection of potentially harmful activity. The coloring system 410 may, for example, label files, executables, processes, network communications, data sources and so forth with any suitable information.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

The network activity system 425 may be used to provide a stream of network activity 424 for storage at a data lake 427. Network activity may be encrypted or unencrypted, and may be provided as an unstructured, partially structured, or structured data stream to the data lake 427. The network activity system 425 may capture network traffic originating at the endpoint 402, originating at the server 406, originating at a third party service provider (e.g., an update server), or any other suitable network activity and/or network traffic features. The network traffic activity and/or features can include destination domain names or IP addresses, reputation of destination domain names or IP addresses, number of packets, size of packets (e.g., packet size, payload size), timing of packets, frequency of packets, response times, whether packets are encrypted or unencrypted, and other such network traffic features.

The data lake 427 may be a network-accessible data lake configured to receive data 424 and provide data 428. In some implementations, the data lake 427 may be a non-transitory computer readable memory (e.g., random access memory), a cache, a drive (e.g., a hard drive), a flash drive, a database system, or another type of component or device capable of storing data. The data lake 427 may also include multiple storage components (e.g., multiple drives or multiple databases) that may also span multiple computing devices (e.g., multiple server computers). In some implementations, data lake 427 may include cloud-based storage such as dynamic storage or other storage.

In general, these monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. Further, the network activity system may provide analysis and/or data associated with software executing on the endpoint 402 such that other potential threats may be identified from a stream of network activity associated with the software. More generally, the cooperation of these systems enables a wide variety of reactive measures that can improve detection and remediation of potential threats to an endpoint.

Figure 5:
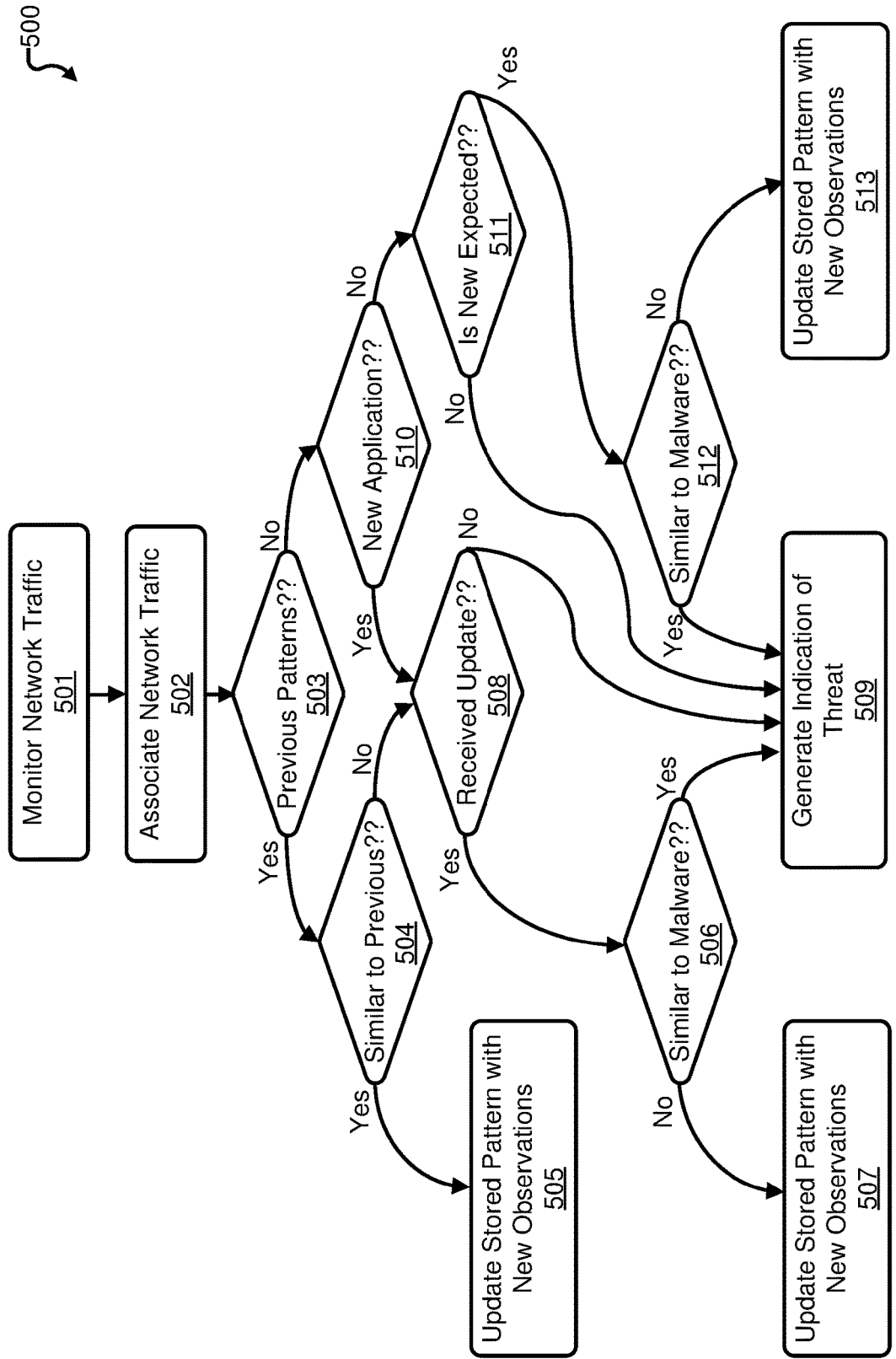
FIG. 5 is a flow diagram of an example method of security threat monitoring for network-accessible devices, in accordance with some implementations.

FIG. 5 shows a flow chart of an example method 500 of security threat monitoring for network-accessible devices. In some implementations, method 500 can be implemented, for example, at a threat management facility such as facilities 100, 308, and 408 described with reference to FIGS. 1-4. In some implementations, method 500 can be implemented, for example, on server 406 described with reference to FIG. 4. In some implementations, method 500 can be implemented by a network monitor such as network monitor 432, or on an endpoint agent, such as security agent S of FIGS. 1-2. In some implementations, some or all of the method 500 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 304, data lake 427, or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., a number of potential threats being above a threshold, new patterns of network activity becoming available to a threat management facility, and/or one or more other conditions occurring which can be specified in settings read by the method.

In general, a firewall or network monitor (e.g., such as threat management facility 100 or network monitor 432) can receive process information from an endpoint (e.g., endpoint 12, 22, etc.) to associate network traffic with a process and an associated application on the endpoint, which is the source of the network traffic. The firewall or network monitor also may be notified about certain activities on the endpoint, such as when a process on the endpoint is started, when an application was last changed, and/or when the application was last updated.

Using an association of network traffic, process, and application information, a firewall or network monitor may characterize network activity, even if some or all of the activity is encrypted, and use that characterization to recognize indications of compromise. For example, machine learning techniques (e.g., using threat detection model 430) may be used to evaluate suspiciousness based on network activity or a lack thereof during application update processes for the endpoints. By filtering and prioritizing threats, automated threat mitigation actions can be performed and/or human threat intervention can advantageously be directed toward contexts most appropriate for non-automated responses. As illustrated in FIG. 5, the method 500 may commence at block 501.

At block 501, network traffic may be monitored by a service, micro-service, network device, network monitor, or other suitable component. The network monitor may be capable of observing network traffic. The network monitor may be able to observe and record characteristics, features, and/or patterns of the network traffic and associated network flows. The network monitor may monitor network traffic originating at the endpoint, originating at a server, originating at a third party service provider (e.g., an update server), or any other suitable network activity and/or network traffic features. The network traffic activity and/or features can include destination domain names or IP addresses, reputation of destination domain names or IP addresses, number of packets, size of packets (e.g., packet size, payload size), timing of packets, frequency of packets, response times, whether packets are encrypted or unencrypted, and other such network traffic features. The network monitor may also be able to determine the similarity of currently observed network traffic patterns to previously observed network traffic patterns. The method continues at block 502.

At block 502, the network monitor is in communication, directly or indirectly, with endpoints that are sources of the observed network traffic. By communicating with, for example, a security agent S on an endpoint, the network monitor can associate a process, an application, "execution" activity, and/or "update" activity with network traffic. This association gives more context for the network traffic, for example: giving information about an actual process and application executing on the endpoint that is the source of the network traffic, whether and when the process was started, and whether the application has been recently updated or changed with an expected update.

For example, the network monitor may send a request to the endpoint that includes a port or interface ID on the endpoint associated with the network traffic. The request may include a date and/or time for the network traffic. The endpoint may respond to the request with contextual information about the network traffic, such as the process, application, start time, update status, and other information. In some implementations, the endpoint may send contextual information to the network monitor without requiring a request. In some implementations, the contextual information is recorded by the endpoint and stored in a data lake (e.g., data lake 427) that is accessible to the network monitor to obtain the contextual information. The method continues at block 503.

At block 503, the network monitor determines whether there are previous network activity patterns stored for the particular process and/or application. For example, if this is not the first time that network traffics from this process have been observed, there would be previous patterns. If there are previous network activity patterns, the method continues at block 504; else, the method continues to block 510.

At block 504, the current network traffic is compared to previous patterns for this process. That is, the characteristics, features, and/or patterns of the network traffic may be compared to determine whether they have changed. The characteristics, features, and/or patterns can include, for example, destination domain names or IP addresses, reputation of destination domain names or IP addresses, number of packets, size of packets (e.g., packet size, payload size), timing of packets, frequency of packets, response times, whether packets are encrypted or unencrypted, and other such network traffic features.

In general, small differences in patterns may be expected, but a substantially different pattern would not be expected. For example, measuring differences between data sets may comprise comparisons of first data and second data, where a small difference may be considered a difference within a first threshold; where a substantial difference may be considered a different within a second threshold; and where the second threshold is larger than the first threshold by a difference value. The difference value may be a value that varies based upon a desired implementation.

As an additional example, the network monitor may collect approximately 100 sets of network traffic for a particular activity. Each of these sets of data could be considered a node with multiple attributes being measured (e.g., time, size, protocol, source, destination, structure, content, etc.). The network monitor may subsequently compute a node similarity, using for example a K-Nearest neighbor algorithm, or leverage other similarity algorithms, to identify outliers from normal or expected comparisons. Determining the acceptable difference between nodes to identify outliers can use statistical standard deviation models and/or percentage differences. In some implementations, different and/or more elaborate models can include weighting that can be applied to attributes to identify outliers differently or more efficiently. For example, the network monitor may also consider that packet size is a critical attribute and that the time variance between send and receive is a non-critical attribute. In this example, a weighting is applied to amplify any differences in packet size and suppress or ignore timing variance below a set or desired threshold. Other data similarity comparisons may also be applicable.

Information about a startup time of the process may also be used to determine patterns that are applicable. For example, for processes that have recently started or initialized, there may be a first pattern, and patterns for later network traffics may be different. If the current network traffic is similar to the stored previous patterns, the method continues at block 505; else, the method continues to block 508.

At block 505, which is executed if the current network traffic is similar to the stored previous patterns (e.g., based on a comparison threshold or other measurable value), the stored patterns may be updated to reflect the new observation.

Determining a comparison threshold or other measurable value may be based upon any desired implementation of data similarity comparisons. If, for example, a traffic pattern for the first 10 seconds of a target application's network activity is identical for all measured attributes and metadata for previous patterns (e.g., low cardinality), then any difference (even on just a single attribute) would indicate a deviation in pattern or that network activity has changed as compared to a previously stored pattern. If, however, the previous pattern has high cardinality where every attribute is different, then it may be difficult to determine if the current network activity is indicative of a change. It is noted that when identifying attributes and metadata, some differences between attributes may be applicable. Examples of attributes for comparisons may include total data transmitted, size of packets (e.g., packet size, payload size), timing of packets, frequency of packets, response times, whether packets are encrypted or unencrypted, and other such network traffic features. Other attributes may also be applicable.

Updates may include, for example, updates to average packet sizes, updates to the last time observed, updates to the total packets for the communication, and other such updates. The method continues at block 506.

At block 508, which is executed if a determination is made at block 504 that the current network traffic is different from previous patterns, a further determination may be made if the application was updated with an expected update. For a given application, an expected update may be an update that has been signed with a digital certificate by the same entity that signed previous version(s) of the application. An expected update may be an update that was made at the time of communication with a known update site. The network monitor may check for an expected update by requesting update status from security agent S on the endpoint, or through an API. Checking for an expected update can also include checking at least a portion of all files and libraries used by the application. An unexpected update may include a change to the application that is not digitally signed, or that does not match the digital signature. An unexpected update may include a change made to application files by an application other than a known updater. If there has been an update, the method continues at block 506; else the method continues to block 509.

At block 507, if there has been an expected update, in that the endpoint has observed that there is an update, and the endpoint does not report any signs that the update is unexpected, the network traffic may be compared to known malware patterns. In one implementation, a trained machine learning model (e.g., threat detection model 430) or an established comparison algorithm may compare one or more patterns of network traffic to determine similarity with the known malware patterns. For example, if there has been tampering with the supply chain or the update process, an update that appears to be legitimate might still be associated with malware. Given that there is a known update, this is a suitable time to check for malware patterns.

As an additional example, when comparing a current pattern to a known malware pattern, the machine learning model may perform a similarity comparison of the current recorded activity to the known malware pattern(s). Generally, a representative set or sets of data with attributes from malicious activity may be stored (e.g., at a data store, data recorder 304, and/or data lake) to effectuate a calculation of the similarity (e.g., node similarity, K-nearest neighbor, etc.) between traffic patterns. The machine learning model may subsequently determine if the current network activity is similar to malware, historic activity, and/or unknown activity. The record of malicious network patterns may also be stored in its own storage component.

Alternatively, instead of calculating a cluster for each malware pattern when performing an evaluation, a portion or all of a set of clusters may have also been calculated and graphed alongside the historic pattern for the monitored network traffic. In this example, when new activity is recorded, the machine learning model can plot new network activity against the same graph that contains malicious and historic activity. Depending on where the new activity lands on the graph, the machine learning mode can indicate if it is similar to historic or malicious activity.

Alternatively, a multi-dimensional graph or comparison may also be applicable. For example, if a graph of network activity is multi-dimensional, the machine learning model may calculate the Euclidean distance for the current network traffic pattern from all malware patterns and the historic record. In this example, the Euclidean distance may form a basis for determining that the network traffic is similar to known malware or historic network activity patterns.

If the network traffic is similar to known malware, the method continues at block 509; else, the method continues to block 507.

At block 507, if the network traffic is not similar to known malware patterns, and the new patterns have followed an update that appears to be legitimate, the new patterns associated with the network traffic are stored and associated with the process and application by the machine learning model (e.g., the threat detection model). These new patterns may now be checked against going forward.

At block 509, an indication of threat may be generated. For example, an indication of threat may be indicated if the application did not receive an expected update (e.g., at block 508), or if there are changes to the application that do not appear to be legitimate, or there were no changes to the application that might explain the changes in communication pattern. The signal of compromise or an indication of threat may further generate an alarm, and/or an alert may be raised. The new pattern may still be compared to malware to provide additional information, but this change in pattern without a change on the endpoint can generally be considered a signal of compromise. Likewise, if at block 506 there was an update that appears to be legitimate but the new pattern is similar to malware, that may also be a signal of compromise, and an alert may be raised. In at least one implementation, the indication of threat may be based upon a security status score generated as output from a trained machine learning model. In some implementations, the security status score may be algorithmically determined without use of a machine learning model. Security status scores in general will be described more fully below.

At block 510, which is executed if there are no previously stored patterns for the process or application determined at block 503, the network monitor may determine whether the process is a new process or application (e.g., a process or application that is recently installed). If the application is recently installed, or if it is not a new application, but there are no recorded patterns, the method proceeds to block 508 to determine if there is an expected update received; else; the method continues at block 511.

At block 511, the process and application may be checked, for example by the network monitor or the endpoint, to determine if the process or application (e.g., a new process or application) is expected. For example, a reputation of the application or process may be determined by the network monitor. Application reputation may be a numeric score based on the global prevalence of the application, age, manufacture, signing certificate, province, and/or additional metadata available for the application. Additionally, a reputation score may be available for any member of a process tree associated with the process or application.

The reputation of the application and reputation of the members of the process tree (e.g., members that generated the monitored network traffic) may be an attribute recorded for the similarity calculations described above. For example, in addition to, or instead of, comparing the recorded network traffic pattern to known traffic patterns, the reputation and other attributes that are available from the endpoint can also be used as a basis for comparison. Some attributes can include: application name, manufacturer, install date, loaded dynamic link libraries (DLLs), parent process, command line of the process, process owner, machine learning malware score for the application, and/or reputation of the application (e.g., how common is that application globally). Any of these additional attributes may be available from the endpoint and can be included along with the network traffic pattern itself.

It is noted that current network traffic pattern analysis is predominantly restricted to the data that a network sniffer can collect. By including additional attributes associated with the endpoint, additional characterizations of malware activity may become apparent.

In addition, digital signatures associated with the application may be confirmed by the network monitor. Additionally, in one implementation, an administrator may be asked whether the new application is expected. If the new application is not expected, this may be a signal of compromise. If the new application is expected, the method continues at block 512; else, block 511 is followed by block 509.

At block 512, if the new application is determined to be expected (at block 511), the network traffic may be compared to known malware patterns. If the new application's network traffic and/or network pattern appears to be similar to known malware patterns, the similarity may also be a signal of compromise. If new application network activity patterns are similar to malware, the method continues at block 513; else, the method continues to block 509.

At block 513, if the new network activity patterns are not similar to malware, the new network activity patterns may be stored and associated with the process and application.

As described herein, computer-implemented methods of security threat monitoring for network-accessible devices may be executed by a network monitor, a network service, a micro-service, or a suitable component or computer-executable component. The method can include, for example, monitoring network traffic on a computer network that includes a plurality of endpoints, wherein the network traffic for each endpoint includes sent data that is transmitted from the endpoint and received data that is received by the endpoint over the computer network. The method can include identifying a software application executing on at least one endpoint from one or more of the sent data or the received data.

The method can also include determining a security status score for the at least one endpoint based on a comparison of the sent data and the received data with a known pattern of network activity associated with the software application, where the known pattern of network activity is based upon a startup time window (e.g., a window when updates are typically received) or another defined time window associated with the software application. The security status score may be based on any of blocks 503-513, such that threshold comparisons may be made between network patterns, network flows, and other data associated with network activity.

The security status score can be derived from individual and observable attributes available on the endpoint or device. Observable attributes may be used individually as multiple security status scores, or an overall security status score may be used. The observable attributes may include: network traffic records, a full process tree for the activity that generated the traffic, and a classification of each of those processes to identify if they map to one or more known tactics/techniques or procedures associated with suspect activity (MITRE ATT&CK). The observable attributes may also include other contemporaneous activity on the device as well as historic activity for the device, user, and process. The observable attributes may also include contextual information about the device, user, and/or process that is associated with the current network activity. These and other attributes may be used to calculate a single security status score or may be used individually.

In one implementation where a single security status score is calculated, the security status score may be a normalized value indicative of an indicator of compromise. For example, a range of [0 to 1] may be used as a security status score where "0" represents no indication of security compromise while "1" may represent a highest level of indication of security compromise. In one implementation, the threat detection model 430 includes a machine learning model configured to determine the security status score based on comparison of network activity patterns associated with a software application, to network activity patterns stored and available for the comparison. In another example, a range of [0 to 100], a binary security status score, and/or a variable security status score may be applicable. The security status score may be output by the threat detection model based on a set of input data comprising at least one pattern of network activity from a target application and a second pattern of network activity for a known, trusted software application or similar software application. The second pattern of network activity may also include one or more of: known malware network activity patterns, known update activity network patterns, and other suitable network activity. In another example, the security status score may be a classifier or categorization output of the threat detection model such that the security status score represents a numerical value indicating a likelihood the software application falls into one or more classifications and/or categories. The numerical value may also be represented as one of the ranges described above, or may be a different range.

Furthermore, the method can include determining a threat status for the at least one endpoint based on the security status score, and generating an indication of the threat status for the at least one endpoint, such as is illustrated at block 509.

In at least one implementation, the execution of the software application is associated with at least two time windows, and the at least two time windows comprise a startup time window and a post-startup time window. Hereinafter, a more detailed description of time windows associated with software applications (and processes, trusted processes, etc.) executing on an endpoint or network-accessible device are presented with reference to FIG. 6.

Figure 6:
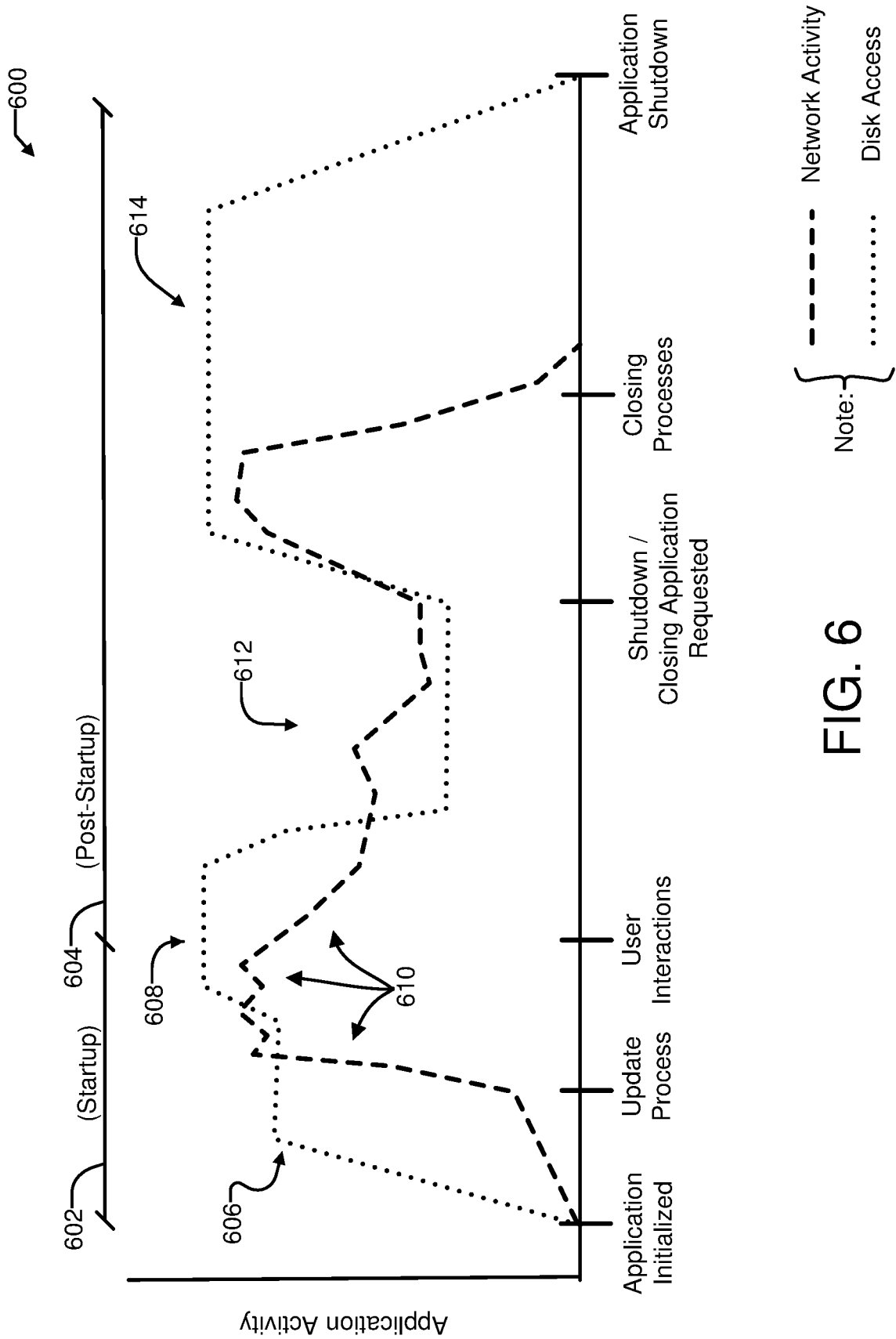
FIG. 6 is a graph of network activity associated with software executing on a network-accessible device, in accordance with some implementations.

FIG. 6 is an example of a graph 600 of network activity associated with software executing on a network-accessible device, in accordance with some implementations. As illustrated, at least two time windows comprise a startup time window 602 and a post-startup time window 604 that are associated with a process or application.

For example, when an application is initialized, a process may perform a handshake to communicate with a server for the application, such as an update server (e.g., for application update) or license server (e.g., to check license status). As shown, disk activity 606 may also increase depending upon necessary access to stored data. The disk activity may generally increase or remain stable, for example data access levels (e.g., at 608 or 612) change depending upon user interactions with the software application.

With regard to startup and initialization of the application, the handshake communication can be characterized, for example, by a network pattern 610 and/or one or more network traffic features. The network traffic features can include destination domain names or IP addresses, reputation of destination domain names or IP addresses, number of packets, size of packets (e.g., packet size, payload size), timing of packets, frequency of packets, response times, whether packets are encrypted or unencrypted, and other such network traffic features. For example, a given process may initiate network communication one time when it is started, once a week, once a month, or several times a day. As another example, an application may download updates at midnight on Wednesdays, or check for updates every day at an interval of 2-3 hours, and not use the network any other times. As yet a further example, every time an application is started, it might initiate a check of the validity of a software license key with a license server.

The pattern 610 of communication for a given application, particularly at application startup, typically does not change, even when the software application is updated. For some applications, like web browsers that regularly use the internet and access a variety of network locations, the traffic generated at application startup is generally consistent.

A network monitor can observe and store patterns of communication for a given process/application, for example, at startup 602 and post-startup 604. The network monitor may observe and store a record of all network traffic to and from a device. The granularity of the stored network traffic may include relatively high level features down to the IP/Port/Protocol level over time. The monitored traffic includes in its structure any observable feature including destination domain names or IP addresses, reputation of destination domain names or IP addresses, number of packets, size of packets (e.g., packet size, payload size), timing of packets, frequency of packets, response times, whether packets are encrypted or unencrypted, and other such network traffic features. The network monitor can observe patterns of communications of specific processes and compare current communication patterns with previously observed patterns. The network monitor can request process and application information from a security agent S (also referred to as an endpoint agent) on the endpoint.

On an endpoint, an endpoint agent stores information about each process and its associated application (e.g., see disk activity 606, 608). The endpoint can provide information about the process that is the source of network traffic, and the associated application. The endpoint agent is configured to identify when a process associated with an application was started, so that pattern matching can be associated with process launch. The endpoint agent may further determine if/when the application software has been changed. For example, the endpoint agent may determine a time when the application files were modified. The endpoint agent may also determine whether the application is digitally signed and check the status of the digital signature.

If the network monitor observes that a given process is communicating differently than in prior network communications during the startup window 602, and the endpoint agent determines that the application was not updated, this observation may be indicative of a potential compromise. For example, if a document viewing application had a pattern of communicating with its developer servers having a high reputation with a particular network traffic feature characteristic, and, 1) the application is now observed communicating with a different server with unknown or low reputation, 2) the network traffic feature characteristic is different than it was before, and 3) the application was not previously updated—the combination of these three characteristics may be indicative that the application has or has not been comprised.

In general, any suitable technique may be used to characterize network traffic and/or network flows. For example, a network traffic tool can be used to characterize network traffic. The network traffic tool can be used to characterize network traffic, where features such as flow duration, total packets in the forward direction, total packets in the backward direction, total length of forward packets, total length of backward packets, forward packet minimum length, forward packet maximum length, and more can be recorded.

In addition, detailed information about each of a predetermined number of packets communicated by a process can be stored. For example, network information for a first packet may be recorded, such as, the source of the first packet, the designation, the packet size, and other types of network information. As another example, for each of the first 100 packets in each direction, packet features may be recorded, and the time periods between each of the packets may be recorded to characterize the network traffic.

If the network monitor observes that a given process is acting differently than it did previously, and the endpoint agent determines that the application was recently updated, the determination performed by the endpoint agent could imply that the update is the cause of the change in behavior by the application. For example, if the document viewing application had a pattern of communicating with certain servers having a high reputation whenever it started up, and it is observed communicating with a different server with unknown or low reputation using a different network traffic characteristic, and it was determined that the application was recently changed, the determination could indicate that the software was corrupted. The changed in the application may be flagged or identified. The endpoint agent also may be directed to conduct a further investigation of the application, such as by scanning the application, any libraries associated with the application, and/or or plug-ins of the application for malware, and by checking digital signatures corresponding to the application and/or libraries.

From the perspective of the network monitor, command and control traffic for malware also has a pattern. Command and Control traffic is network traffic from an application/service on a device to an internet location where its behavior is being directed from. Such command and control traffic can be as rudimentary as a bot checking in for updates or additional instructions to an adversary interacting directly with a command line terminal on the device. On its own, network traffic with a similar pattern to command and control traffic might not be a strong enough signal to indicate a malware infection, but if a known application is observed having a different communication characteristic and/or pattern than previously, and the new characteristic and/or pattern is the same or similar to malware command and control traffic, the new characteristic and/or pattern may be strongly indicative that the application has been corrupted by malware. For example, if the document viewing application is observed not only having a different characteristic network traffic pattern, but the pattern resembles a Cobalt Strike instance, the pattern similarity to the Cobalt Strike instance would be a strong signal that the document viewing application has been affected by malware.

If the document viewing application had not been updated (e.g., for a period of time), and now was acting differently, the change in behavior could be an indication that malware may have injected itself into the application. Remediation techniques for an application that has been compromised in memory may include scanning the memory of the application, terminating the application, terminating and restarting the application, and other such remediation techniques. The remediation techniques may be facilitated and/or directed by the security agent S on the endpoint, in some implementations.

In characterizing network traffic, it is possible to consider the process/application for one device, or to look at the process/application across an enterprise network. Typically, the same or similar software may be executing on multiple systems. If there is a difference in the network traffic pattern for a given software program for different devices, that could also be an indicator of compromise.

The network monitor can also develop a network characterization for process/application across a customer base, so that there is a baseline that is an initial characteristic for a given process/application. Deviation from the baseline would also be a signal of potential compromise. In this example, a simple standard deviation calculation may be performed by the network monitor to determine a deviation from baseline outside a predetermined or desired threshold. Additionally, a more advanced graph similarity calculations as described above may also be applicable. For example, given an N-dimensional Euclidean calculation, a standard deviation calculation for the distance from a center point for the pattern and a known pattern may be performed by the machine learning model. In this example, a threshold may be adjusted after training based on feedback from an operator and depending upon disposal of the output classification of the machine learning model.

A signal or indication of compromise may result in an alert raised to a user, administrator, or security team member. One or more remediation actions may be performed including, but not limited to, automatically rerouting or blocking network traffic, performing an anti-virus scan, terminating and/or suspending a source process on the endpoint, and/or restarting the application. An investigation case may be created, which may include an event graph that shows processes or artifacts that interacted with the process or application. Remediation may be automatically directed based on an assessment of whether the application has recently been modified.

As further shown in FIG. 6, the post-startup window 604 may include other activity that is useful to be monitored, such as user interaction activity 612 and/or shutdown activity 614. In some implementations, the activity associated with particular portions or sub-portions of the post-startup time window may also be used to characterize indicators of compromise.

As described above, network activity may be monitored to determine security status of particular applications and/or processes associated with an endpoint. Hereinafter, an additional example method of monitoring network traffic and/or monitoring security threats is presented with reference to FIG. 7.

Figure 7:
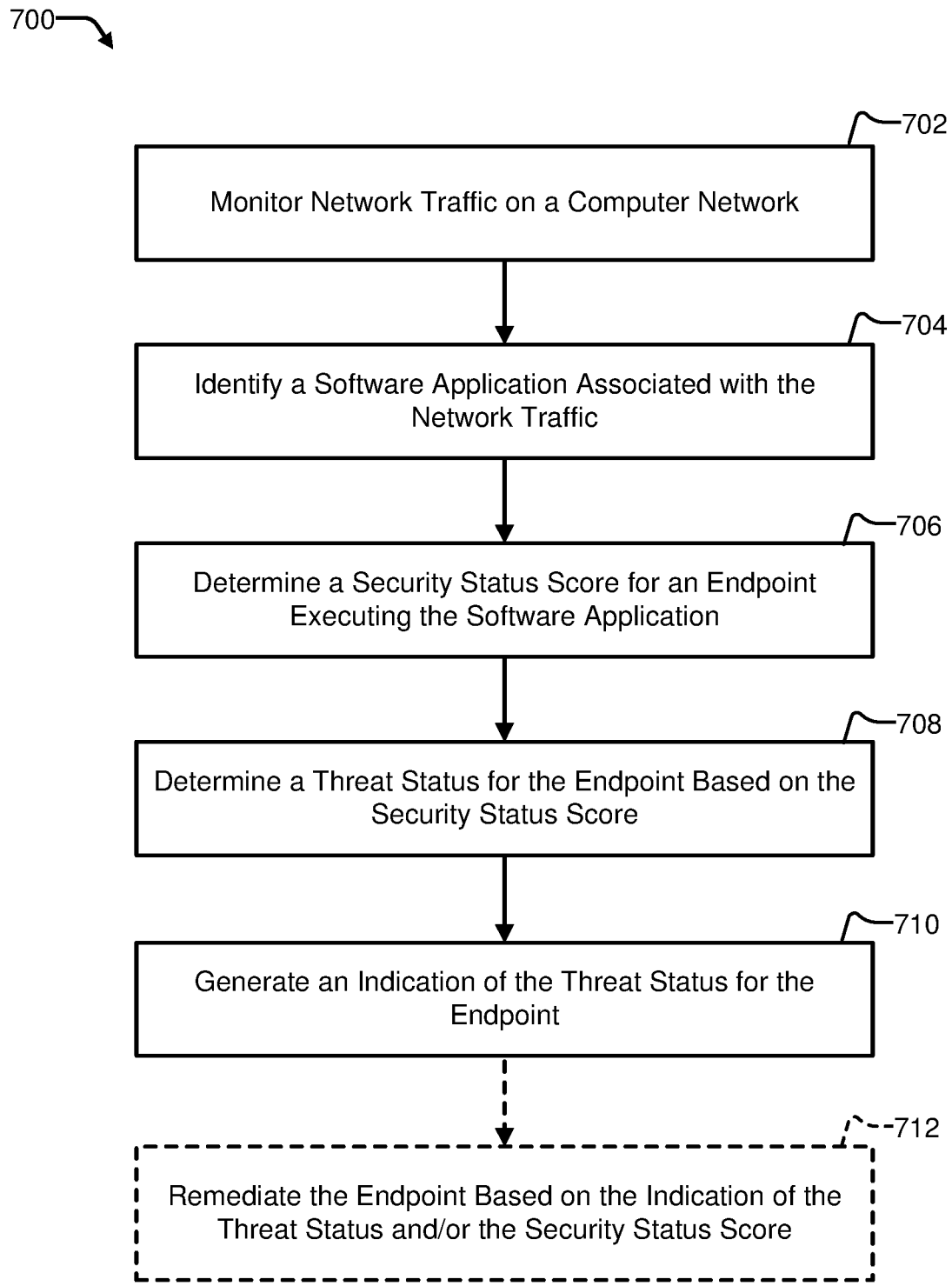
FIG. 7 is a flow diagram of an example method of security threat monitoring for network-accessible devices, in accordance with some implementations.

FIG. 7 is a flow diagram of an example method 700 of security threat monitoring for network-accessible devices. In some implementations, method 700 can be implemented, for example, at a threat management facility such as facilities 100, 308, and 408 described with reference to FIGS. 1-4. In some implementations, method 700 can be implemented, for example, on server 406 described with reference to FIG. 4.

In some implementations, method 700 can be implemented by a network monitor such as network monitor 432, or on an endpoint agent, such as security agent S of FIGS. 1-2. In some implementations, some or all of the method 700 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 304, data lake 427, or other storage). In some implementations, different components of one or more servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In some implementations, the method 700, or portions of the method, can be initiated automatically by a system. In some implementations, the implementing system is a first device. For example, the method (or portions thereof) can be periodically performed, or performed based on one or more particular events or conditions, e.g., a number of potential threats being above a threshold, new patterns of network activity becoming available to a threat management facility, and/or one or more other conditions occurring which can be specified in settings read by the method.

In some implementations, machine learning techniques may be used to evaluate suspiciousness based on network activity or a lack thereof during software update processes for endpoints. By filtering and prioritizing threats, automated threat mitigation actions can be performed and/or human threat intervention can advantageously be directed toward contexts most appropriate for non-automated responses.

Method 700 may begin at block 702. At block 702, network traffic associated with endpoints on a network may be monitored. Generally, some endpoints may have software installed thereon. Network activity for the endpoints may be monitored, e.g., using self-reporting by the endpoints and associated data recorders, such that robust logs of network activity are obtained which may be used to train a security status detection model, e.g., a machine learning model such as model 430. In addition or instead, network activity may be obtained by monitoring the network on which the endpoints are deployed, for example, by a firewall, gateway, or a network monitor. Network requests for security information may be made by endpoints. For example, application information or updates from software vendors may be requested by the endpoints.

Model training may be performed using the training data and a suitable training method. For example, to train a machine learning model, unsupervised learning or supervised learning algorithms may be used. For example, if the type or vendor of software deployed on the endpoint is known, training data may be labeled with this information. For example, if a given endpoint is known to be unable to deploy software, training data may be labeled with this information.

It should be understood that in some cases endpoints may be deployed specifically for the purpose of monitoring network activity for the purpose of determining training data, and in addition or instead endpoints that are already deployed may provide training data (e.g., network data). Accordingly, while described as being "deployed," existing endpoints may also be used. For example, network traffic in existing networks may be used for generating training data.

In general, the network traffic for each endpoint includes sent data that is transmitted from the endpoint and received data that is received by the endpoint over the computer network. The sent data and the received data may be associated with a software application executing on the monitored endpoint. In some implementations, the network traffic is encrypted, and monitoring the network traffic includes identifying a plurality of destination addresses from the sent data, wherein the destination addresses are Internet Protocol (IP) addresses, and passively analyzing the network traffic to determine destination IP addresses that are associated with the endpoints without decrypting the network traffic.

In some implementations, network traffic patterns may be based upon prior software installations on trusted endpoints or devices. For example, in some implementations, the network monitor or a remote device can direct one or more endpoints to install a current version of the software application from a trusted product vendor, and build the known pattern of network activity based on the network traffic of the one or more endpoints with the current version of the software application. In some implementations, the network monitor or a remote device can direct one or more endpoints to update a prior version of the software application to a current version of the software application from a trusted product vendor, and build the known pattern of network activity based on network traffic of the one or more endpoints during updating of the software application. Additionally, the network traffic of one or more trusted endpoints can be characterized to create a baseline pattern of network activity as the known pattern of network activity. The method continues at block 704.

At block 704, the software application may be identified. For example, the execution of the software application is associated with at least two time windows, and the at least two time windows can include a startup time window and a post-startup time window. The method continues at block 706.

At block 706, a security status score may be determined for the endpoint. For example, the security status score may be based on a comparison of the sent data and the received data with a known pattern of network activity associated with the software application. In one implementation, a trained machine learning model may be configured to output the security status score based on the sent data, the received data, and/or the known pattern of network activity. The trained machine learning model may increase or decrease the security status score based upon the comparison of network activity such that an increase in score represents an increase in similarity, and such that a decrease in score represents a decrease in similarity. The known pattern of network activity may be based upon the startup time window of the software application. In some implementations, the known pattern of network activity may be based upon an update-time-window of the software application or another time window or portion thereof.

In some implementations, the security status score may be based on determining a level of match between network traffic features associated with sent and/or received data (e.g., destination IP addresses) with the known pattern of network activity. The security status score can then be adjusted based on the level of match such that endpoints with destination IP addresses that have a first level of match to the known pattern of network activity are assigned higher security status scores than endpoints that have a second level of match. Additionally, the first level of match is greater than the second level of match, in this example.

In some implementations, the security status score can also be based on comparisons of data item sizes. For example, the received data can includes a plurality of data items received from a first group of endpoints and a second group of endpoints. Thereafter, a size of each of the plurality of data items can be determined. In this example, received data items that have a size different than a known size of software application patches are determined to be associated with the first group of endpoints, and received data items that have a size similar to the known size of software application patches are determined to be associated with the second group of endpoints. Furthermore, the security status can be based on assigning to each endpoint in the first group of endpoints a score lower than any endpoint in the second group of endpoints. Other variations may also be applicable.

For example, determining the security status score can also include one or more of: determining that the endpoint has received data that matches known software patches from a trusted product vendor, determining that the endpoint has deviated from the known pattern of network activity during the startup time window, or determining that the endpoint has a startup time window that deviates from an established startup time window. The method continues at block 708. As described above, a K-nearest neighbor calculation, node similarity, and/or other similar methodologies may be used to determine the security status score. Additionally, a single security status score based upon several attributes may be used. Moreover, in some implementations, several other security status scores based upon individual attributes may also be applicable in some implementations.

At block 708, a threat status is determined for the endpoint based on the security status score. For example, determining the threat status can include comparing the security status score to a variable security status threshold. The variable security status threshold can be varied from a base threshold based upon one or more of: third party security threat signals, wherein the third party security threat signals are signals received from actively monitored third party security threat sources, a threat detection model deployed at the at least one endpoint, wherein the threat detection model is configured to monitor kernel-level activity at the at least one endpoint, or a data lake in operative communication with the at least one endpoint, wherein the data lake is configured to store a stream of network activity associated with the at least one endpoint. Other variations may also be applicable. The method continues at block 710.

At block 710, an indication of the threat status is generated for the endpoint. The threat status may be indicated in any suitable manner. For example, in some implementations, an alarm, display, or other action can be presented to a user and/or a network administrator. The method may continue at block 712.

At block 712, the endpoint may be remediated based on the indication of threat status and/or the security status score. The remediation may be facilitated by the network monitor, by the endpoint agent, or by another component configured to execute remediation techniques as described in detail above. For example, based on the threat status, a security action can be initiated on the endpoint. The security action can include one or more of: running an anti-malware scan, terminating the software application, restarting the software application, or verifying a digital signature of the software application. Other variations may also be applicable.

Hereinafter, a more detailed description of various computing devices that may be used to implement different devices (e.g., the server 14 and/or endpoints 12, 22) illustrated in FIG. 1 and FIG. 2 is provided with reference to FIG. 8.

Figure 8:
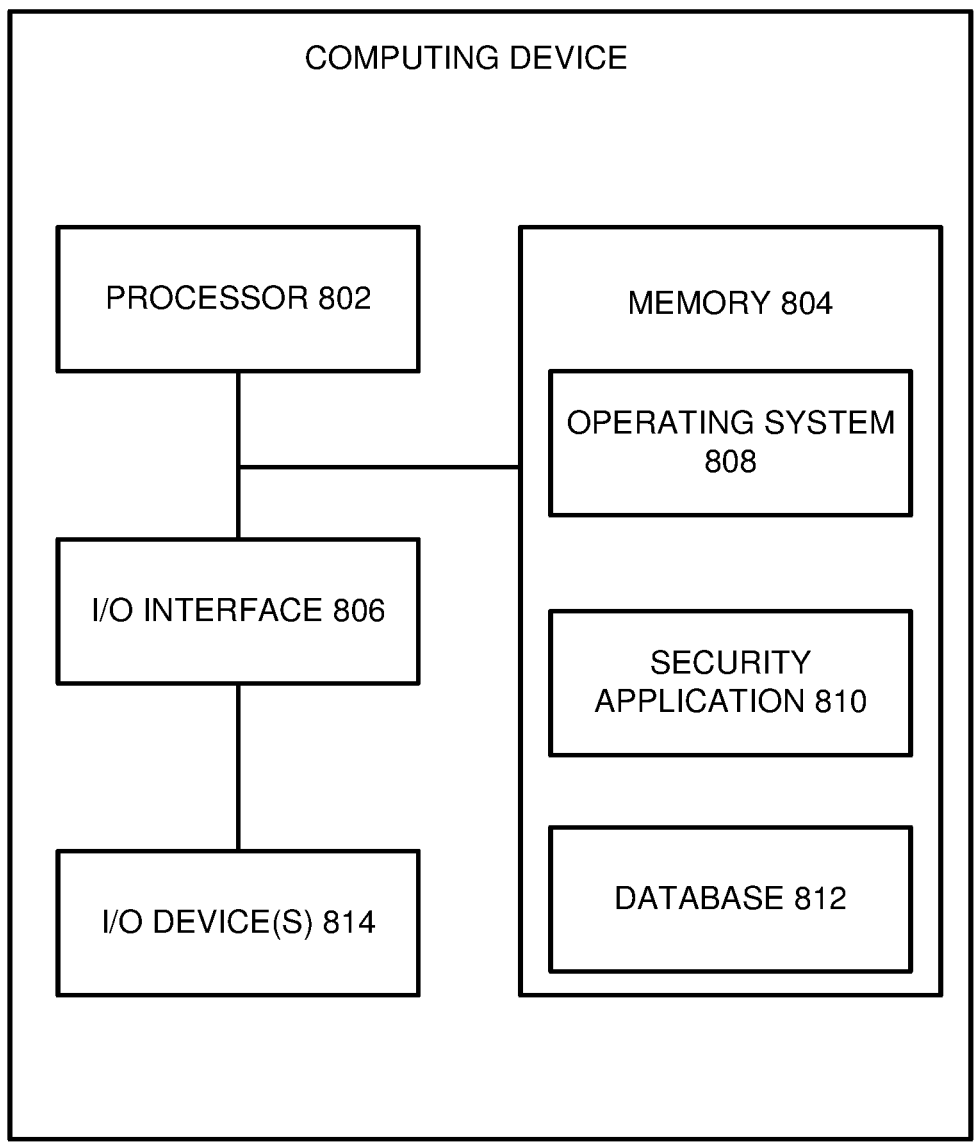
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 110 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, a security application or computer program product 810, and a database 812.

Memory 804 can include software instructions for executing the operations as described with reference to FIGS. 1-7. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 116), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808, and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a user device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more user devices, servers, and threat management facilities. In some implementations, one or more methods described herein can be implemented, for example, on a server system with a dedicated threat management facility, and/or on both a server system and any number of threat management facilities. In some implementations, different components of one or more servers and or user devices can perform different blocks, operations, or other parts of the methods.

One or more methods described herein (e.g., method 500 and/or method 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
    monitoring network traffic on a computer network that includes a plurality of endpoints, wherein the network traffic for each endpoint includes sent data that is transmitted from the endpoint and received data that is received by the endpoint over the computer network;
    identifying a software application executing on at least one endpoint from one or more of the sent data or the received data, wherein:
        the execution of the software application is associated with at least two time windows, and
        the at least two time windows comprise a startup time window and a post-startup time window;
    determining a security status score for the at least one endpoint based on a comparison of the sent data and the received data with a known pattern of network activity associated with the software application, wherein the known pattern of network activity is based upon the startup time window of the software application;
    wherein determining the security status score includes,
        determining a level of match between network traffic features associated with destination IP addresses for the at least one endpoint with the known pattern of network activity, and
        adjusting the security status score based on the level of match such that endpoints with destination IP addresses that have a first level of match to the known pattern of network activity are assigned higher security status scores than endpoints that have a second level of match, wherein the first level of match is greater than the second level of match;
    determining a threat status for the at least one endpoint based on the security status score; and
    generating an indication of the threat status for the at least one endpoint.

2. The computer-implemented method of claim 1, wherein the network traffic is encrypted, and wherein monitoring the network traffic comprises:
    identifying a plurality of destination addresses from the sent data, wherein the destination addresses are Internet Protocol (IP) addresses; and
    analyzing the network traffic to determine destination IP addresses that are associated with the endpoints without decrypting the network traffic.

3. The computer-implemented method of claim 1, wherein the received data includes a plurality of data items received from a first group of endpoints and a second group of endpoints, the method further comprising:
    determining a size of each of the plurality of data items, wherein received data items that have a size different than a known size of software application patches are determined to be associated with the first group of endpoints, and wherein received data items that have a size similar to the known size of software application patches are determined to be associated with the second group of endpoints; and
    wherein determining the security status score comprises assigning to each endpoint in the first group of endpoints a score lower than any endpoint in the second group of endpoints.

4. The computer-implemented method of claim 1, further comprising:
    directing one or more endpoints of the plurality of endpoints to install a current version of the software application from a trusted product vendor; and
    building the known pattern of network activity based on the network traffic of the one or more endpoints with the current version of the software application.

5. The computer-implemented method of claim 1, further comprising:
    directing one or more endpoints of the plurality of endpoints to update a prior version of the software application to a current version of the software application from a trusted product vendor; and
    building the known pattern of network activity based on network traffic of the one or more endpoints during updating of the software application.

6. The computer-implemented method of claim 1, further comprising:
    characterizing network traffic of one or more trusted endpoints of the plurality of endpoints to create a baseline pattern of network activity as the known pattern of network activity.

7. The computer-implemented method of claim 1, wherein the determining the security status score comprises determining that the endpoint has a startup time window that deviates from an established startup time window.

8. The computer-implemented method of claim 1, wherein the known pattern of network activity comprises:
    network activity associated with one or more trusted endpoints of the plurality of endpoints.

9. The computer-implemented method of claim 1, wherein determining the threat status comprises:
    comparing the security status score to a variable security status threshold, wherein the variable security status threshold is varied from a base threshold based upon a threat detection model deployed at the at least one endpoint, wherein the threat detection model is configured to monitor kernel-level activity at the at least one endpoint.

10. The computer-implemented method of claim 1, further comprising updating the known pattern of network activity based upon observation of threat statuses for one or more trusted endpoints of the plurality of endpoints.

11. The computer-implemented method of claim 1, further comprising:
based on the threat status, initiating a security action on the endpoint, wherein the security action includes one or more of:
running an anti-malware scan;
terminating the software application;
restarting the software application; or
verifying a digital signature of the software application.

12. The computer-implemented method of claim 1, further comprising:
activating an endpoint agent at the at least one endpoint, wherein the endpoint agent is configured to monitor the network traffic, identify the software application, and determine the security status score.

13. The computer-implemented method of claim 12, wherein the endpoint agent is further configured to perform one or more of:
identifying when a process associated with the software application is initiated and associate a network activity pattern with process launch;
determining when the software application has been changed or updated; or
determining that the software application has been recently updated.

14. A computer-implemented method, comprising:
monitoring network traffic on a computer network that includes a plurality of endpoints;
associating a software application executing on at least one endpoint with the monitored network traffic, wherein the execution of software application is associated with at least two time windows, and wherein the at least two time windows comprise a startup time window and a post-startup time window;
determining if previous patterns of network activity are known for the startup time window of the software application;
if the previous patterns are known, determining a security status score for the at least one endpoint based on a comparison of the monitored network traffic and the previous patterns of network activity;
wherein determining the security status score includes,
determining a level of match between network traffic features associated with destination IP addresses for the at least one endpoint with the previous patterns of network activity, and
adjusting the security status score based on the level of match such that endpoints with destination IP addresses that have a first level of match to the previous patterns of network activity are assigned higher security status scores than endpoints that have a second level of match, wherein the first level of match is greater than the second level of match;
determining a threat status for the at least one endpoint based on the security status score; and
generating an indication of the threat status for the at least one endpoint.

15. The computer-implemented method of claim 14, further comprising:

if previous patterns are known, determining if the monitored network traffic is correlated with the previous patterns of network activity; and
if the monitored network traffic is correlated with the previous patterns, updating the previous patterns of network activity to include at least a portion of the monitored network traffic.

16. The computer-implemented method of claim 14, further comprising:
determining if the software application is a new process or new application;
if the software application is a new process or new application, determining if the software application is an expected software application for the at least one endpoint;
if the software application is an expected software application, determining if the monitored network traffic contains a pattern of network activity similar to malware;
if the pattern of network activity similar to malware is determined, adjusting the security status score; and
if the pattern of network activity is dissimilar to malware, creating or updating a previous pattern of network activity for the software application.

17. The computer-implemented method of claim 14, further comprising:
determining if the software application received an expected software update;
if the software application received the expected update, determining if the monitored network traffic contains a pattern of network activity similar to malware; and
if the pattern of network activity similar to malware is determined, adjusting the security status score; and
if the pattern of network activity is dissimilar to malware, creating or updating a previous pattern of network activity for the software application.

18. A threat management computer system for managing security threats on an enterprise network, comprising:
a memory with instructions stored thereon;
one or more processing devices, coupled to the memory, the one or more processing devices configured to access the memory and execute the instructions; and
one or more network devices coupled to the one or more processing devices and configured to receive requests issued by a plurality of client devices, wherein the instructions cause the one or more processing devices to perform operations including:
monitoring network traffic on a computer network that includes a plurality of endpoints, wherein the network traffic for each endpoint includes sent data that is transmitted from the endpoint and received data that is received by the endpoint over the computer network;
identifying a software application executing on at least one endpoint from one or more of the sent data or the received data, wherein the execution of software application is associated with at least two time windows, and wherein the at least two time windows comprise a startup time window and a post-startup time window;
determining a security status score for the at least one endpoint based on a comparison of the sent data and the received data with a known pattern of network activity associated with the software application, wherein the known pattern of network activity is based upon the startup time window of the software application;

wherein determining the security status score comprises:

determining a level of match between network traffic features associated with destination IP addresses for the at least one endpoint with the known pattern of network activity; and adjusting the security status score based on the level of match such that endpoints with destination IP addresses that have a first level of match to the known pattern of network activity are assigned higher security status scores than endpoints that have a second level of match, wherein the first level of match is greater than the second level of match;

determining a threat status for the at least one endpoint based on the security status score; and generating an indication of the threat status for the at least one endpoint.

\* \* \* \* \*